United States Patent [19]

Awojulu

[11] Patent Number: 6,150,466

[45] Date of Patent: *Nov. 21, 2000

[54] PROCESS FOR DYNAMICALLY CROSSLINKED THERMOPLASTIC ELASTOMER CONTAINING A METAL HALIDE ANTIBLOOM AGENT

[75] Inventor: Emmanuel A. Awojulu, Newark, Del.

[73] Assignee: Montell North America Inc., Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 09/034,961

[22] Filed: Mar. 4, 1998

[51] Int. Cl.[7] .............................. C08L 23/12; C08L 23/16; C08L 23/26

[52] U.S. Cl. ......................... 525/194; 196/197; 196/211; 196/232; 196/237

[58] Field of Search ..................................... 525/194, 196, 525/197, 211, 232, 237

[56] References Cited

U.S. PATENT DOCUMENTS

| | | |
|---|---|---|
| 4,801,651 | 1/1989 | Komatsu et al. . |
| 4,871,796 | 10/1989 | Komatsu et al. ........................ 524/474 |
| 5,073,597 | 12/1991 | Puydak et al. .......................... 525/193 |
| 5,157,081 | 10/1992 | Puydak et al. .......................... 525/237 |
| 5,196,462 | 3/1993 | Berta ......................................... 524/94 |
| 5,948,867 | 9/1999 | Abhau ..................................... 525/194 |

OTHER PUBLICATIONS

Kissin, "Linear Low Density Polyethylene", Kirk–Othmer Encyclopedia of Chemical Technology, 4th ed., vol. 17, pp756–757 (1995).

*Primary Examiner*—Donald R. Wilson

[57] ABSTRACT

A dynamically crosslinked thermoplastic elastomer composition contains (1) a thermoplastic olefin, (2) an elastomeric copolymer of ethylene and a 3–8 C alpha-olefin, optionally containing a diene, (3) a halide of tin, zinc, or calcium, and (4) an organic peroxide curing agent selected from (a) an aromatic peroxide and (b) a combination of an aromatic and an aliphatic peroxide. Injection molded and extruded articles made from the composition do not exhibit blooming.

5 Claims, No Drawings

PROCESS FOR DYNAMICALLY CROSSLINKED THERMOPLASTIC ELASTOMER CONTAINING A METAL HALIDE ANTIBLOOM AGENT

FIELD OF THE INVENTION

This invention relates to dynamically crosslinked thermoplastic elastomer compositions.

BACKGROUND OF THE INVENTION

Polymer blends that exhibit some of the properties of a cured elastomer as well as the reprocessability of a thermoplastic resin can be used for a variety of applications and can be processed on equipment designed for thermoplastic materials. The elastomeric characteristics are enhanced if one component of the blend is a vulcanizable elastomer that is wholly or partially crosslinked.

Many of these polymer blends use an organic peroxide curing system. It is known that using an aromatic peroxide increases the degree of crosslinking and produces better compression set compared to other thermoplastic elastomer compositions. However, when the aromatic peroxide dissociates, unreacted radicals form alcohols and ketones, which produce "blooming" at the surface of injection molded and extruded articles.

It is known to use a small amount of tin chloride monohydrate as a catalyst for a phenolic curing system for thermoplastic polyolefins, for example, as disclosed in U.S. Pat. Nos. 5,073,597 and 5,157,081. These two patents disclose a dynamically vulcanized thermoplastic composition comprising (a) a bromobutyl rubber as a primary elastomer, (b) EPM and/or EPDM as a secondary elastomer, and (c) a plastic matrix of crystalline polypropylene. U.S. Pat. No. 5,196,462 discloses the preparation of a fully crosslinked thermoplastic elastomer using a phenolic curing system consisting of a halogenated or non-halogenated phenolic resin and a combination of a metal oxide and a halogen donor such as $SnCl_2 \cdot 2H_2O$ or $ZnCl_2$. The thermoplastic elastomer comprises (i) a propylene homopolymer or ethylene/propylene copolymer, (ii) an ethylene copolymer or terpolymer rubber, (iii) a semi-crystalline ethylene copolymer that is xylene insoluble at room temperature, and, optionally, (iv) polybutene-1.

However, there is still a need for an additive to prevent blooming when aromatic peroxides are used in the curing system, either alone or in combination with an aliphatic peroxide.

SUMMARY OF THE INVENTION

The dynamically crosslinked thermoplastic elastomer composition of this invention comprises:
 (1) about 30 parts to about 60 parts by weight of a thermoplastic olefin comprising:
    (a) about 20% to about 70% of a propylene homopolymer having an isotactic index greater than 90, or a crystalline propylene copolymer with ethylene and/or a 4–8 C alpha-olefin having a propylene content greater than 85% and an isotactic index greater than 85%;
    (b) about 30% to about 75% of an amorphous ethylene-propylene or ethylene-butene polymer, optionally containing about 1% to about 10% of a diene, which polymer is xylene soluble at room temperature and contains about 30% to about 70% ethylene, and
    (c) about 3% to about 30% of a semi-crystalline ethylene-propylene or ethylene-butene copolymer that is xylene insoluble at room temperature and contains greater than 90% ethylene;
 (2) about 40 parts to about 70 parts by weight of an elastomeric polymer of ethylene and a 3–8 C alpha-olefin, optionally containing about 1% to about 10% of a diene, and having an ethylene content of about 30% to about 70%, wherein (1)+(2)=100 parts by weight;
 (3) about 0.4 parts to about 6.0 parts per hundred parts of (1)+(2) of a metal halide selected from the group consisting of the halides of tin, zinc, and calcium; and
 (4) an organic peroxide crosslinking agent selected from the group consisting of (a) about 0.5 parts to about 4.0 parts per hundred parts of (1)+(2) of an aromatic peroxide, and (b) a combination of about 0.3 parts to about 2.0 parts of an aromatic peroxide and about 0.2 parts to about 1.5 parts of an aliphatic peroxide, per hundred parts of (1)+(2),
 wherein the ratio by weight of metal halide to aromatic peroxide is at least 0.6.

Injection molded and extruded articles made from the compositions of this invention have good compression set and do not exhibit blooming when exposed to light at room temperature.

DETAILED DESCRIPTION OF THE INVENTION

Component (1) of the composition of this invention is a thermoplastic olefin comprising:
 (a) about 20% to about 70%, preferably about 20% to about 50%, of a propylene homopolymer having an isotactic index greater than 90, preferably greater than 98, or a crystalline propylene copolymer with ethylene and/or a 4–8 C alpha-olefin having a propylene content greater than 85% and an isotactic index greater than 85;
 (b) about 30% to about 75%, preferably about 30% to about 50%, of an amorphous ethylene-propylene or ethylene-butene-1 polymer, optionally containing about 1% to about 10%, preferably about 1% to about 5%, of a diene, which polymer is xylene soluble at room temperature and contains about 30% to about 70% ethylene, and
 (c) about 3% to about 30%, preferably about 5% to about 20%, of a semi-crystalline ethylene-propylene or ethylene-butene-1 copolymer that is xylene insoluble at room temperature and contains greater than 90% ethylene.

The 4–10 C alpha-olefins useful in the preparation of component (1)(a) include butene-1; pentene-1; hexene-1; 4-methylpentene-1, and octene-1.

The diene, when present in component (1)(b), is typically a butadiene; 1,4-hexadiene; 1,5-hexadiene, or ethylidenenorbornene.

Component (1) is present in an amount of about 30 parts to about 60 parts, preferably about 35 parts to about 45 parts, by weight.

Preferably (a), (b), and (c) of component (1) are formed in a reactor or series of reactors in at least two stages by first polymerizing propylene to form component (a) and then polymerizing ethylene and propylene or ethylene and butene-1 in the presence of (a) and the catalyst used in the first stage to form components (b) and (c). The polymerization can be conducted in the liquid or gas phase or in liquid-gas phase. In the alternative, (a), (b), and (c) can each be prepared separately and then mixed by melt-kneading or melt blending.

Component (2) is an elastomeric polymer of ethylene and a 3–8 C alpha-olefin, optionally containing about 1% to about 10%, preferably about 1% to about 4%, of a diene, and having an ethylene content of about 30% to about 70%, preferably about 40% to about 60%. The copolymer is present in an amount of about 40parts to about 70parts, preferably about 60 parts to about 70 parts, by weight.

Component (1) plus component (2) equal 100 parts by weight.

Component (3) is a metal halide, preferably in anhydrous form, selected from the group consisting of the halides of tin, zinc, and calcium. The chlorides are the preferred halides. Tin chloride is most preferred. The metal halide is present in an amount of about 0.4 parts to about 6.0 parts, preferably about 1.5 parts to about 2.5 parts, per hundred parts of (1)+(2).

Component (4) is an organic peroxide crosslinking agent selected from the group consisting of (a) an aromatic peroxide, and (b) a combination of an aromatic and an aliphatic peroxide. The amount of aromatic peroxide and therefore the amount of metal halide antibloom agent required can be reduced by using a combination of an aromatic peroxide and an aliphatic peroxide. Aliphatic peroxides do not produce blooming.

The peroxide crosslinking agent must have a half-life of 3.3 to 20( minutes, preferably 7 to 18 minutes, at 160° C. in ethylene/propylene/diene monomer rubber (EPDM). Suitable examples of aromatic peroxides that can be used in the present invention include 1,1'-bis(t-butylperoxy) diisopropylbenzene, dicumyl peroxide, phenylene bis(1-methylethylidene) bis(1,1-dimethylethyl) peroxide and n-butyl-4,4 '-bis(t-butylperoxy) valerate. Suitable aliphatic peroxides that can be combined with the aromatic peroxide include 2,5-di-(t-butylperoxy)-2,5-dimethylhexane.

When used alone, the aromatic peroxide curing agent is present in an amount of 0.5 parts to about 4.0 parts, preferably about 1.0 parts to about 1.5 parts, per hundred parts of (1)+(2). When a combination of an aromatic and an aliphatic peroxide is used, the aromatic peroxide is present in an amount of about 0.3 to about 2.0 parts, preferably about 0.5 part to about 1.0 part, and the aliphatic peroxide is present in an amount of about 0.2 to about 1.5 parts, preferably about 1.0 to about 1.5 parts, per hundred parts of (1)+(2).

The ratio by weight of the metal halide to the aromatic peroxide is at least 0.6, preferably at least 2.0.

The crosslinking of the composition is carried out using the peroxide curing system described above and at least one crosslinking aid selected from 1,2-polybutadiene and furan derivatives of the formula:

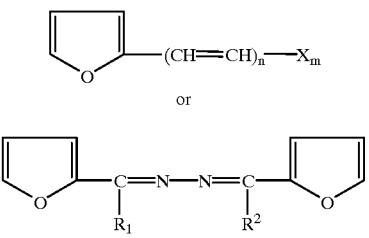

where X is a radical of the formula —CHO, —COOH, —CHONH$_2$, —CN, —NO$_2$, —CH$_2$COCH$_2$COOR, —CH(COOR)$_2$, where R is an aryl group containing 6–8 carbon atoms or an alkyl group containing 1–4 carbon atoms, n is 1 or 2, R$^1$ and R$^2$ are the same or different and are hydrogen, an alkyl group containing 1 to 4 carbon atoms, or a cycloalkyl group containing 5 to 8 carbon atoms.

The 1,2-polybutadiene has a molecular weight of at least 1300 to about 13,000, preferably at least 2400 to about 13,000. The 1,2-vinyl content is at least 50%, preferably 50% to about 90%, and most preferably about 70% to about 90%. The amount of 1,2-polybutadiene present is from about 2 to about 20 parts, preferably about 4 to about 12 parts, based on 100 parts of components (1)+(2). The 1,2-polybutadiene call be used in the liquid or solid supported form and is commercially available in both forms.

The furan derivatives of the formula described above that can be used in the present invention are known in the art and can be prepared according to the method described in U.S. Pat. No. 2,738,338, which method is incorporated herein by reference. Suitable examples include 1,5-difurfuryl-1,4-pentadiene-3-one; β-(α-furyl)acrolein; 5-(α-furyl) pentadienal; α-furylacrylamide; α-furylacrylonitrile, and β-(α-furyl)acrylic acid and its esters. The furan derivatives are used in an amount of 0. 15 to 3 parts, preferably 0.17 to 2 parts based on 100 parts of (1)+(2).

The dynamically crosslinked thermoplastic elastomers of the present invention are obtained by adding the peroxide curing system to the thermoplastic olefin and the rubber, and subjecting the mixture to curing conditions while masticating the mixture to bring about the desired dynamic cure. The thermoplastic elastomer compositions are typically cured to a gel content of about 80% to about 99%, preferably about 85% to about 97%, and most preferably about 90% to about 95%. The method for determining gel content is described below.

The mixing and mastication are carried out at a temperature between 160° C. and 240° C., preferably between 180° C. and 220° C., for a period of about 2 to about 30minutes, preferably about 3 to 20 minutes. At the above curing conditions at least 97% of the curing agent is depleted, generally 98% to 99%, based on the theoretical half-life at 160° C. in EPDM. The mastication or shearing process can be carried out on an open roll, in an internal mixer (e.g., Banbury or Haake mixers), and in single screw or twin screw extruders.

The curing system can further contain other coagents, such as, for example, phenylene-bis-maleimide and/or sulfur donors such as mercaptobenizothiazole, benzothiazyldisulfide, tetramethylthiuram monosulfide, tetramethylthiuram disulfide, dipentamethylenethiuram hexasulfide, N, N'-diethylthiourea, amylphenol disulfide and zinc dibutyldithiocarbamate. The amount of other coagent used is about 0.5 to about 3 parts, preferably about 1 to about 2.5 parts, and the amount of sulfur donor is about 0.15 to about 3 parts, preferably about 0.17 to about 2 parts, based on 100 parts of (1)+(2).

When the curing system contains an additional coagent and/or sulfur donor, the coagent is generally added along with the crosslinking aid and the sulfur donor is generally added in combination with the peroxide component.

In addition to the above major components, an antioxidant is generally present in an amount of about 0.1 to about 0.9 parts, based on 100 parts of (1)+(2). Suitable examples of antioxidants that can be used are thiophenols such as 4,4'-thio-bis-(6-t-butyl-m-cresol); phosphites such as tris-nonylphenyl phosphite; phenolic esters such as tetrakismethylene-3-(3,5'-di-t-butyl-4'-hydroxyl-propionate)-methane; thiodipropionates such as dilaurylthiopropionate; hydroquinones such as 2,5-di-t-butylhydroquinone, and 2,2,4-trimethyl-1,2-dihydroquinoline, all of which are commercially available.

The compositions of the present invention can also contain other conventional additives, for example, extender oils, such as paraffinic and naphthenic oils, in an amount of about 20 to about 100 parts, preferably about 25 to about 60parts, and more preferably about 25 to about 50 parts, based on 100 parts of the rubber; or zinc oxide, in an amount of about 1.5 to about 6 parts, based on 100 parts of (1)+(2).

The compositions of this invention can be fabricated on equipment used for processing thermoplastic materials, e.g., for extrusion, injection and compression molding, thermoforming, and blow molding.

Percent gel content is determined by soaking a weighed 1.5 inch by 0.75 inch by 0.080 inch test specimen in about 100 ml of cyclohexane at about 23° C. for 48 hours, removing the sample and drying to constant weight (about 72 hours) in a vacuum oven at 80° C. The % gel is calculated as:

$$\% \text{ gel} = \frac{\text{Initial wt. of rubber} \times \text{wt. of rubber extracted}}{\text{Initial wt. of rubber in sample}} \times 100\%$$

Two types of blooming were observed in the absence of the antibloom agent, i.e., a white powder and crystals. Both are believed to be the same material, with different forms appearing at different times after molding or extrusion. While not wishing to be bound by theory, it is believed that the substances causing blooming are ketone and alcohol degradation products of the aromatic peroxide. With extruded sheets, blooming occurred instantly in the absence of the antibloom agent. White powder and crystals could be seen on the sheet and the take-off rollers. Samples of extruded sheet were identified in the tables as having "no bloom" when they did not exhibit blooming after exposure to light at room temperature for 2 hours, even when viewed under an optical microscope at 15× magnification. Molded plaques were designated as having "no blooming" when they did not exhibit blooming after exposure to light at room temperature for three weeks.

The following test methods were used for measuring the physical properties of the compositions in the examples and comparative examples:

| | |
|---|---|
| Shore A hardness | ASTM D-2240 |
| 100% Modulus | ASTM D-412 |
| 200% Modulus | ASTM D-412 |
| Tensile strength | ASTM D-638-89 |
| Elongation at yield | ASTM D-638-89 |
| Melt flow rate | ASTM D-1238 (230° C., 2.16 kg) |
| Compression set | ASTM D-395 |

In this application, all parts and percentages are by weight unless otherwise noted.

EXAMPLES 1–3 AND COMPARATIVE EXAMPLES 1–2

These examples and comparative examples show the effectiveness of various metal chlorides in preventing blooming in extruded sheets and injection molded plaques made from a dynamically crosslinked thermoplastic elastomer composition containing both an aromatic and an aliphatic peroxide. The amount of each component of the composition is shown in Table 1.

In Table 1, the amounts of the TPO and the Dutral 4038PL rubber are given in parts by weight and the sum of the two equals 100 parts. The amounts of the other components are given in parts per hundred parts of the TPO plus the Dutral 4038PL rubber. The thermoplastic olefin (TPO) was a composition that includes (i) 35% of a propylene homopolymer having an isotactic index, defined as the xylene insoluble fraction, of 97.5, (ii) 6.9% of a semi-crystalline ethylene/propylene copolymer that is xylene insoluble at room temperature, and (ii) 58% of an amorphous ethylene/propylene copolymer rubber that is xylene soluble at room temperature. Dutral 4038PL is an ethylene/propylene/ethylidenenorbornene terpolymer rubber containing 4% ethylidenenorbornene, commercially available from Enichem America Inc.

Santonox R 4,4'-thio-bis-(6-t-butyl-m-cresol) antioxidant is commercially available from Monsanto Company. Ricon 154 low molecular weight polybutadiene is commercially available from Ricon Resins, Inc. The aromatic peroxide was VC-60peroxide, a 40% dispersion of 1,1-bis(t-butylperoxy)diisopropylbenzene in ethylene/propylene/diene rubber, commercially available from Rein Chemie Inc. (*In Table 1, the actual amount of peroxide in VC-60was 40% of the amount given.) The aliphatic peroxide was Varox DBPH-50peroxide, a 50% concentrate on clay of 2,5-dimethyl-2,5-di(t-butylperoxy)hexane, commercially available from R. T. Vanderbilt Company Inc. (**In Table 1, the actual amount of peroxide in Varox DBPH50was 50% of the amount given.)

EF 44A processing aid, which is a blend of fatty acid derivatives, predominantly zinc soaps, is commercially available from Struktol Company of America. Flexon 815 petroleum distillate is commercially available from Exxon Company, USA. Irganox 1035 thiodiethylene bis(3,5-di-t-butyl-4-hydroxyhydrocinnamate) is commercially available from CIBA Specialty Chemicals Corporation. Zetax zinc salt of mercaptobenzothiazole is commercially available from R. T. Vanderbilt Company, Inc.

TABLE 1

| Example | 1 | 2 | Comp. Ex. 1 | Comp. Ex. 2 | 3 |
|---|---|---|---|---|---|
| TPO (parts by wt.) | 38.10 | 38.10 | 38.10 | 38.10 | 38.10 |
| Dutral 4038PL rubber (parts by wt.) | 61.90 | 61.90 | 61.90 | 61.90 | 61.90 |
| Santonox R antioxidant (pph) | 0.57 | 0.57 | 0.57 | 0.57 | 0.57 |
| ZnO (pph) | 3.33 | 3.33 | 3.33 | 3.33 | 3.33 |
| Ricon 154 liquid polybutadiene (pph) | 7.62 | 7.62 | 7.62 | 7.62 | 7.62 |
| Arom. peroxide (pph)* | 1.90 | 1.90 | 1.90 | 1.90 | 1.90 |
| Aliph. peroxide (pph)** | 2.86 | 2.86 | 2.86 | 2.86 | 2.86 |
| CaCO$_3$ (pph) | 7.62 | 7.62 | 7.62 | 7.62 | 7.62 |
| EF 44A processing aid (pph) | 1.90 | 1.90 | 1.90 | 1.90 | 1.90 |
| Flexon 815 pet. distillate (pph) | 57.14 | 57.14 | 57.14 | 57.14 | 57.14 |
| Irganox 1035 stabilizer (pph) | 0.29 | 0.29 | 0.29 | 0.29 | 0.29 |
| Zetax Zn salt (pph) | 1.90 | 1.90 | 1.90 | 1.90 | 1.90 |
| SnCl$_2$ (pph) | 2.38 | — | — | — | — |
| ZnCl$_2$ (pph) | — | 2.38 | — | — | — |
| FeCl$_3$ (pph) | — | — | 2.38 | — | — |
| NiCl$_2$ (pph) | — | — | — | 2.38 | — |
| CaCl$_2$ (pph) | — | — | — | — | 2.38 |

The samples were compounded on a 2.5 pound Banbury mixer, with the temperature of the circulating oil around the mixing bowl set at 150° F. The initial screw speed was set at 200 rpm. The TPO, Dutral 4038 PL rubber, Santonox R antioxidant, ZnO, Ricon 154 liquid polybutadiene, the aromatic peroxide, the aliphatic peroxide, CaCO$_3$, and the EF 44A processing aid were charged to the mixing bowl and the contents were mixed for about five minutes. The Flexon 815 petroleum distillate was then added and mixing was continued for about 2 minutes until the material was homogenized. Irganox 1035 antioxidant, Zetax zinc salt of mercaptobenzothiazole, and the metal halide were added last. The material was mixed for another two minutes before it was removed from the mixing bowl.

While the material was still hot it was laid out on a table, cut into small pieces and allowed to cool. The material was then frozen in dry ice and ground up.

Part of the ground material was used to make extruded sheets 0.83" thick and 1.75" wide on a Brabender 3/16" single screw extruder. The processing temperature was uniform at 170° C. in all zones. Cooling was accomplished by the surrounding air and by passing the sheet over a take-off roller. Samples for testing were die cut along the machine direction of the sheet.

The rest of the material was used to make 3×3×0.8" injection molded plaques on a 1.5 oz Battenfeld injection molding machine. The processing temperature was 390°, 400°, and 420° F. in zones 1, 2 and the die, respectively. The mold temperature was between 85" and 115° F., and the total cycle time per shot was less than 25 seconds. All injection molded samples were conditioned at constant temperature and humidity for at least 24 hours before cutting with a die to the size and shape required by the ASTM testing methods that were used. Samples for testing were die cut about 2" away from the gate, and in a direction perpendicular to the flow.

The results of the physical property testing for each sample are given in Table 2. In Table 2 "NB" stands for no bloom.

EXAMPLES 4–10 AND COMPARATIVE EXAMPLES 3–5

These examples and comparative examples show the effectiveness of tin chloride as an antibloom agent in dynamically crosslinked thermoplastic elastomer compositions containing various amounts of an aromatic peroxide, with or without an aliphatic peroxide.

The components of the samples were the same as in Examples 1–3. The samples were compounded and formed into extruded sheets as described in Examples 1–3. The amounts of each component, the results of the blooming determination, and the compression set values are shown in Table 3. The amounts of the TPO and the Dutral 4038PL rubber are given in parts by weight and the sum of the two equals 100 parts. The amounts of the other components are given in parts per hundred parts of the TPO plus the Dutral 4038PL rubber.

In Table 3, "NB" stands for no bloom. The actual amount of peroxide in the VC-60 aromatic peroxide is 40% of the

TABLE 2

| Example | 1 | 2 | Comp. Ex. 1 | Comp Ex. 2 | 3 |
|---|---|---|---|---|---|
| Antibloom material | $SnCl_2$ | $ZnCl_2$ | $FeCl_3$ | $NiCl_2$ | $CaCl_2$ |
| Shore A (injection molded) | 60/58 | 60/58 | 60/57 | 60/57 | 60/57 |
| (extruded) | 60/58 | 59/55 | 58/55 | 57/55 | 57/56 |
| Modulus @ 100% (injection molded) | 268 | 260 | 268 | 269 | 288 |
| (extruded) | 285 | 261 | 284 | 334 | 327 |
| Modulus @ 200% (injection molded) | 421 | 416 | 433 | 442 | 0 |
| (extruded) | 466 | 430 | 482 | 629 | 606 |
| Tensile strength (psi) (injection molded) | 609 | 583 | 668 | 697 | 474 |
| (extruded) | 764 | 660 | 787 | 667 | 709 |
| Elongation @ yield (%) (injection molded) | 306 | 291 | 315 | 321 | 180 |
| (extruded) | 339 | 308 | 326 | 210 | 231 |
| MFR (dg/min) | 2 | 4.3 | 1.7 | 3.7 | 39.2 |
| Compression set | 35 | 38 | 39 | 45 | 41 |
| Bloom Results | | | | | |
| Extruded sheet | NB | NB | Bloom | Bloom | NB |
| Injection molded plaques | NB | NB | Bloom | Bloom | NB |

The data show that $SnCl_2$, $ZnCl_2$, and $CaCl_2$ were effective antibloom agents, while $FeCl_3$ and $NiCl_2$ were not. A compression set of 30–45 was considered acceptable.

amount given in the table. The actual amount of peroxide in the Varox DBPH50 aliphatic peroxide is 50% of the amount given in the table.

TABLE 3

| Example | 4 | 5 | Comp. 3 | 6 | 7 | Comp. 4 | 8 | 9 | 10 | Comp. 5 |
|---|---|---|---|---|---|---|---|---|---|---|
| TPO (parts by wt.) | 38.10 | 38.10 | 38.10 | 38.10 | 38.10 | 38.10 | 38.10 | 38.10 | 38.10 | 38.10 |
| Dutral 4038PL rubber (parts by wt.) | 61.90 | 61.90 | 61.90 | 61.90 | 61.90 | 61.90 | 61.90 | 61.90 | 61.90 | 61.90 |
| Santanox R antioxidant (pph) | 0.57 | 0.57 | 0.57 | 0.57 | 0.57 | 0.57 | 0.57 | 0.57 | 0.57 | 0.57 |
| ZnO (pph) | 3.33 | 3.33 | 3.33 | 3.33 | 3.33 | 3.33 | 3.33 | 3.33 | 3.33 | 3.33 |
| Ricon 154 liquid polybutadiene (pph) | 7.62 | 7.62 | 7.62 | 7.62 | 7.62 | 7.62 | 7.62 | 7.62 | 7.62 | 7.62 |
| Arom. peroxide* (pph) | 0.95 | 0.95 | 0.48 | 3.81 | 4.76 | 4.76 | 1.90 | 1.90 | 1.90 | 1.90 |
| Al. peroxide** (pph) | 3.81 | 3.81 | 3.33 | 0.00 | 0.00 | 0.00 | 2.86 | 2.86 | 2.86 | 2.86 |
| $CaCO_3$ (pph) | 7.62 | 7.62 | 7.62 | 7.62 | 7.62 | 7.62 | 7.62 | 7.62 | 7.62 | 7.62 |
| EF44A processing aid (pph) | 1.90 | 1.90 | 1.90 | 1.90 | 1.90 | 1.90 | 1.90 | 1.90 | 1.90 | 1.90 |
| Irganox 1035 stabilizer (pph) | 61.91 | 61.91 | 61.91 | 61.91 | 61.91 | 61.91 | 57.14 | 57.14 | 57.14 | 57.14 |
| Zetax Zn salt (pph) | 1.90 | 1.90 | 1.90 | 1.90 | 1.90 | 1.90 | 1.90 | 1.90 | 1.90 | 1.90 |
| $SnCl_2$ (pph) | 1.43 | 1.90 | 0.00 | 0.95 | 1.90 | 0.00 | 1.43 | 1.90 | 2.86 | 0.00 |
| Observation | NB | NB | Bloom | NB | NB | Bloom | NB | NB | NB | Bloom |
| Compression set | 37.0 | 34.0 | 34.0 | 40.0 | 35.0 | 35.0 | 35.0 | 37.0 | 36.0 | 37.0 |

The data show that there was no blooming when SnCl$_2$ was present in the composition.

EXAMPLES 11–22

These examples show the effect on physical properties when using various amounts of tin chloride as an antibloom agent ill dynamically crosslinked thermoplastic elastomer compositions containing various amounts of an aromatic peroxide, with or without an aliphatic peroxide.

The components of the samples are the same as in the previous examples. The samples were compounded and formed into extruded sheets and molded plaques as described in Examples 1–3. The amounts of each component are shown in Table 4. The amounts of the TPO and the Dutral 4038PL rubber are given in parts by weight and the sum of the two equals 100 parts. The amounts of the other components are given in parts per hundred parts of the TPO plus the Dutral 4038PL rubber.

The results of the physical property tests are given in Table 5. "NB" stands for no blooming. The actual amount of the peroxide in the VC-60 aromatic peroxide is 40% of the amount shown in the table. The actual amount of peroxide in the Varox DBPH50 aliphatic peroxide is 50% of the amount shown in the table.

The data show that no blooming occurs when SnCl$_2$ is present in the composition.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

What is claimed is:

1. A process for preventing blooming in molded or extruded articles made from a dynamically crosslinkable thermoplastic elastomer composition containing an aromatic organic peroxide crosslinking agent, the process comprising mixing a dynamically crosslinkable thermoplastic elastomer composition consisting essentially of:

(1) about 30 parts to about 60 parts by weight of a thermoplastic olefin prepared by sequential polymerization in two or more stages comprising:
 (a) about 20% to about 70% by wt. of a propylene homopolymer having an isotactic index, defined as the xylene insoluble portion, greater than 90, or a crystalline propylene copolymer with ethylene and/or a 4–8 C alpha-olefin having a propylene content

TABLE 4

| Example | 11 | 12 | 13 | 14 | 15 | 16 | 17 | 18 | 19 | 20 | 21 | 22 |
|---|---|---|---|---|---|---|---|---|---|---|---|---|
| TPO (parts by wt.) | 38.10 | 38.10 | 38.10 | 38.10 | 38.10 | 38.10 | 38.10 | 38.10 | 38.10 | 38.10 | 38.10 | 38.10 |
| Dutral 4038PL rubber (parts by wt.) | 61.90 | 61.90 | 61.90 | 61.90 | 61.90 | 61.90 | 61.90 | 61.90 | 61.90 | 61.90 | 61.90 | 61.90 |
| Santanox R (pph) | 0.57 | 0.57 | 0.57 | 0.57 | 0.57 | 0.57 | 0.57 | 0.57 | 0.57 | 0.57 | 0.57 | 0.57 |
| ZnO (pph) | 3.33 | 3.33 | 3.33 | 3.33 | 3.33 | 3.33 | 3.33 | 3.33 | 3.33 | 3.33 | 3.33 | 3.33 |
| Ricon 154 liquid polybutadiene (pph) | 7.62 | 7.62 | 7.62 | 7.62 | 7.62 | 7.62 | 7.62 | 7.62 | 7.62 | 7.62 | 7.62 | 7.62 |
| Ar. peroxide* (pph) | 0.95 | 0.95 | 0.95 | 0.95 | 4.76 | 4.76 | 4.76 | 4.76 | 1.90 | 1.90 | 1.90 | 1.90 |
| Al. peroxide** (pph) | 3.81 | 3.81 | 3.81 | 3.81 | 0.00 | 0.00 | 0.00 | 0.00 | 2.86 | 2.86 | 2.86 | 2 86 |
| CaCO$_3$ (pph) | 7.62 | 7.62 | 7.62 | 7.62 | 7.62 | 7.62 | 7.62 | 7.62 | 7.62 | 7.62 | 7.62 | 7 62 |
| EF44A (pph) | 1.90 | 1.90 | 1.90 | 1.90 | 1.90 | 1.90 | 1.90 | 1.90 | 1.90 | 1.90 | 1.90 | 1 90 |
| Flexon 815 pet. distillate (pph) | 61.91 | 61.91 | 61.91 | 61.91 | 61.91 | 61.91 | 61.91 | 61.91 | 57.14 | 57.14 | 57.14 | 57.14 |
| Irganox 1035 stabilizer (pph) | 0.29 | 0.29 | 0.29 | 0.29 | 0.29 | 0.29 | 0.29 | 0.29 | 0.29 | 0.29 | 0.29 | 0.29 |
| Zetax Zn salt (pph) | 1.90 | 1.90 | 1.90 | 1.90 | 1.90 | 1.90 | 1.90 | 1.90 | 1.90 | 1.90 | 1.90 | 1.90 |
| SnCl$_2$ (pph) | 1.43 | 1.90 | 2.86 | 3.81 | 1.43 | 1.90 | 2.86 | 3.81 | 1.43 | 1.90 | 2.86 | 3.81 |

TABLE 5

| Example | 11 | 12 | 13 | 14 | 15 | 16 | 17 | 18 | 19 | 20 | 21 | 22 |
|---|---|---|---|---|---|---|---|---|---|---|---|---|
| Shore A | 57/54 | 60/57 | 57/54 | 59/55 | 57/54 | 58/55 | 59/55 | 58/55 | 59/55 | 61/57 | 60/56 | 59/55 |
| (extruded) | 58/56 | 60/56 | 56/52 | 55/51 | 57/53 | 56/53 | 56/56 | 56/52 | 56/52 | 60/56 | 56/52 | 56/52 |
| Modulus @ 100% | 215 | 272 | 221 | 237 | 236 | 234 | 237 | 229 | 235 | 246 | 233 | 223 |
| (extruded) | 216 | 273 | 217 | 222 | 240 | 242 | 244 | 237 | 230 | 271 | 246 | 242 |
| Modulus @ 200% | 324 | 490 | 336 | 383 | 386 | 381 | 386 | 373 | 377 | 409 | 372 | 348 |
| (extruded) | 340 | 492 | 334 | 364 | 406 | 407 | 400 | 389 | 374 | 466 | 408 | 394 |
| Tensile strength (psi) | 687 | 466 | 674 | 640 | 501 | 601 | 573 | 502 | 595 | 605 | 621 | 621 |
| (extruded) | 527 | 655 | 729 | 610 | 564 | 566 | 595 | 607 | 642 | 730 | 597 | 663 |
| Elongation @ yield (%) | 472 | 190 | 437 | 357 | 264 | 326 | 305 | 276 | 332 | 303 | 348 | 383 |
| (extruded) | 333 | 246 | 451 | 345 | 274 | 356 | 295 | 310 | 354 | 318 | 292 | 338 |
| MFR (dg/min) | 0.7 | 76 | 2.3 | 19.2 | 5.2 | 5 | 11.1 | 11 | 14.3 | 2.3 | 1.7 | 11.1 |
| Compression set | 37 | 34 | 38 | 37 | 35 | 35 | 35 | 35 | 35 | 37 | 36 | 37 |
| Blooming Result | | | | | | | | | | | | |
| Extruded sheet | NB | NB | NB | NB | NB | NB | NB | NB | NB | NB | NB | NB |
| Injection molded plaques | NB | NB | NB | NB | NB | NB | NB | NB | NB | NB | NB | NB | greater than 85% by wt. and an isotactic index, defined as the xylene insoluble portion, greater than 85;

(b) about 30% to about 75% by wt. of an amorphous ethylene-propylene or ethylene-butene-1 polymer, optionally containing about 1% to about 10% by wt. of a diene, which polymer is xylene soluble at room temperature and contains about 30% to about 70% by wt. ethylene, and (c) about 3% to about 30% by wt. of a semi-crystalline ethylene-propylene or ethylene-butene-1 copolymer that is xylene insoluble at room temperature and contains greater than 90% by wt. ethylene;

(2) about 40parts to about 70parts by weight of an elastomeric polymer of ethylene and a 3–8 C alpha-olefin, optionally containing about 1% to about 10% by wt. of a diene, and having an ethylene content of about 30% to about 70% by wt., wherein (1)+(2)=100 parts by weight; and (3) an organic peroxide crosslinking agent selected from the group consisting of (a) about 0.5 parts to about 4.0 parts per hundred parts of (1)+(2) of an aromatic peroxide, and (b) a combination of about 0.3 parts to about 2.0 parts of an aromatic peroxide and about 0.2 parts to about 1.5 parts of an aliphatic peroxide, per hundred parts of (1)+(2), with about 0.4 parts to about 6.0 parts per hundred parts of (1)+(2) of a metal halide antiblooming agent selected from the group consisting of the halides of tin, zinc, and calcium, wherein the weight ratio of the metal halide to the aromatic peroxide is at least 0.6.

2. The process of claim 1 wherein component (1)(a) is a propylene homopolymer and components (1)(b) and (1)(c) are ethylene/propylene copolymers.

3. The process of claim 1 wherein the elastomeric ethylene polymer is an ethylene/propylene/ethylidenenorbornene terpolymer.

4. The process of claim 1 wherein the metal halide is tin chloride.

5. The process of claim 1 wherein the ratio by weight of the metal halide to the aromatic peroxide is at least 2.0.

* * * * *